(12) United States Patent
Mittal

(10) Patent No.: US 10,536,577 B2
(45) Date of Patent: Jan. 14, 2020

(54) METHOD AND APPARATUS FOR DATA CHANNEL AUGMENTED VOICE TELEPHONY SYSTEMS

(71) Applicant: Millind Mittal, Saratoga, CA (US)

(72) Inventor: Millind Mittal, Saratoga, CA (US)

( * ) Notice: Subject to any disclaimer, the term of this patent is extended or adjusted under 35 U.S.C. 154(b) by 0 days.

(21) Appl. No.: 15/619,470

(22) Filed: Jun. 10, 2017

(65) Prior Publication Data

US 2017/0279963 A1 Sep. 28, 2017

Related U.S. Application Data

(63) Continuation-in-part of application No. 14/827,742, filed on Aug. 17, 2015, now Pat. No. 9,680,994, which is a continuation-in-part of application No. 13/912,422, filed on Jun. 7, 2013, now Pat. No. 9,112,970, which is a continuation of application No. 12/951,018, filed on Nov. 20, 2010, now Pat. No. 8,565,388.

(60) Provisional application No. 61/361,889, filed on Jul. 6, 2010, provisional application No. 61/361,885, filed on Jul. 6, 2010.

(51) Int. Cl.
| | |
|---|---|
| *H04M 3/493* | (2006.01) |
| *H04M 15/06* | (2006.01) |
| *H04M 11/08* | (2006.01) |
| *H04M 1/725* | (2006.01) |
| *H04M 15/00* | (2006.01) |
| *H04M 3/42* | (2006.01) |
| *H04M 3/436* | (2006.01) |
| *H04M 3/51* | (2006.01) |
| *H04M 3/527* | (2006.01) |

(52) U.S. Cl.
CPC ....... *H04M 3/493* (2013.01); *H04M 1/72583* (2013.01); *H04M 3/42382* (2013.01); *H04M 3/4365* (2013.01); *H04M 3/4931* (2013.01); *H04M 11/08* (2013.01); *H04M 15/06* (2013.01); *H04M 15/56* (2013.01); *H04M 15/8083* (2013.01); *H04M 15/8221* (2013.01); *H04M 1/72552* (2013.01); *H04M 3/5166* (2013.01); *H04M 3/527* (2013.01); *H04M 2201/42* (2013.01); *H04M 2203/651* (2013.01)

(58) Field of Classification Search
None
See application file for complete search history.

(56) References Cited

U.S. PATENT DOCUMENTS

| 7,480,631 B1 * | 1/2009 | Merced | G06Q 20/3674 |
| | | | 235/380 |
| 9,876,904 B2 * | 1/2018 | Alfano | H04M 3/02 |
| 2003/0138087 A1 * | 7/2003 | Takeda | H04M 1/663 |
| | | | 379/207.02 |
| 2004/0192356 A1 * | 9/2004 | Oh | H04L 51/38 |
| | | | 455/466 |

(Continued)

*Primary Examiner* — Maria El-Zoobi
(74) *Attorney, Agent, or Firm* — Stephen E. Zweig

(57) ABSTRACT

A computerized method of terminating audio telephone calls that provides the other party with more information as to why the telephone call was terminated. This method, which is particularly useful for computerized smartphones equipped with voice and data channel communications methods, automatically provides the user with a variety of different informative text messages that can be selected by the user and sent to the other party at the time that a voice call is terminated.

10 Claims, 12 Drawing Sheets

(56) References Cited

U.S. PATENT DOCUMENTS

| | | | |
|---|---|---|---|
| 2007/0036286 A1* | 2/2007 | Champlin | H04L 51/066 379/67.1 |
| 2007/0198253 A1* | 8/2007 | Luehrig | G06Q 30/0258 704/221 |
| 2008/0304637 A1* | 12/2008 | Ganganna | H04M 1/663 379/88.23 |
| 2011/0014932 A1* | 1/2011 | Estevez | G01S 19/14 455/466 |

* cited by examiner

METHOD AND APPARATUS FOR DATA CHANNEL AUGMENTED VOICE TELEPHONY SYSTEMS

CROSS REFERENCE TO RELATED APPLICATIONS

This application is a continuation in part in part of U.S. patent application Ser. No. 14,827,742, "METHOD AND APPARATUS FOR DATA CHANNEL AUGMENTED AUTO ATTENDED VOICE RESPONSE SYSTEMS", inventor Millind Mittal, filed Aug. 17, 2015, now U.S. Pat. No. 9,680,994 issued Jun. 13, 2017; application Ser. No. 14/827,742 was a continuation in part of application Ser. No. 13/912,422, "METHOD AND APPARATUS FOR DATA CHANNEL AUGMENTED AUTO ATTENDED VOICE RESPONSE SYSTEMS", inventor Millind Mittal, filed Jun. 7, 2013, now U.S. Pat. No. 9,112,970; application Ser. No. 13/912,422 was a continuation of US patent application continuation of application Ser. No. 12/951,018, "METHOD AND APPARATUS FOR DATA CHANNEL AUGMENTED AUTO ATTENDED VOICE RESPONSE SYSTEMS", inventor Millind Mittal, filed Nov. 20, 2010, now U.S. Pat. No. 8,565,388; application Ser. No. 12/951,018 in turn claimed the priority benefit of provisional application No. 61/361,885 entitled "Method and Apparatus for Augmented Dialing System", filed Jul. 6, 2010, inventor Millind Mittal; and also priority benefit of provisional application No. 61/361,889, entitled "Method and Apparatus for Data Channel Augmented Auto Attendant and Interactive Voice Response Systems", filed Jul. 6, 2010, inventor Millind Mittal; the contents of all of these applications are incorporated herein by reference.

BACKGROUND OF THE INVENTION

Field of the Invention

The field of the invention is related to data channel assisted telephone systems and telecommunications technology.

Description of the Related Art

Over the years automated telephone answering machines, such as automated attendants, (also called auto attendant (AA) systems, virtual receptionist systems, interactive voice response (IVR) systems, AA/IVR systems, and other names) have evolved from relatively simple devices to rater complex computerized devices. Modern automated telephone attendants can, for example, automatically answer telephone calls from a user, play a standard message, and then await a response from the incoming caller. This response will often come in the form of user telephone key presses, which often generate a standardized set of tones called Dual-tone multi-frequency tones (DTMF), or which may come in the form of more sophisticated voice recognition systems that recognizes incoming caller voice input, and can connect the incoming caller appropriately. These auto attendant systems can often have a complex menu structure, in which an incoming caller from the outside may, for example, go down a complex tree like sequence of AA/IVR recorded voice prompts and incoming caller replies in order to connect the incoming caller with the particular person, departmental function, or information that the incoming caller desires.

In this specification, these systems will often be referred to as AA/IVR systems, or generically often as remote auto attendant telephony systems, and the incoming caller will occasionally be referred to in the alternative as the caller or the user. The person or information that the incoming caller is trying to reach will often be referred to as the receiver or the callee.

Some of the AA/IVR systems in use today include systems that operate using voice communication over traditional Public Switched Telephone Networks (PSTN), as well as systems that operate over packet networks using voice-over-IP technologies. Many commercial owners or users of AA/IVR systems also operate websites which can provide additional information, and indeed often in this case, the organization's AA/IVR voice prompt will encourage incoming users to stop using the telephone connection, and instead switch to using web browser to access the organization's website for further information.

There are various ways in which an incoming caller can call and interact with an individual or organization that operates an AA/IVR system and/or an additional website. These include voice only connections, data only connections, and simultaneous but separate voice and data connections.

In a voice only connection, typically the incoming caller will talk to the callee or receiver using either a conventional voice connection or Voice over IP connection. In both cases, usually a telephone number is used to identify the callee, and the identity of the caller can also often be ascertained by using the caller's telephone number. This mode of communication will frequently be referred to as voice channel communications. The telephone number used to contact the AA/IVR system will often be referred to generically as directory information.

In a data only connection, the caller (or user) will typically not use the AA/IVR system at all, but rather will interact with the callee (or organization) through a separate web browser web-site network connection. Here the identity of the callee and the caller are established through their respective IP address. This mode of communication is one example of data channel communications, but other data channel communications that do not rely on web server web browser technology are of course also common. Some of these data channel based informational sites allow initiating voice communication by clicking on an icon or web link. However, this voice communication is then carried out as an independent communication.

In a simultaneous but separate voice and data connection, the caller and callee may interact using both a voice connection for interacting with the AA/IVR system (and through the AA/IVR system to the callee or the callee's automated messaging system agent), and also using a data channel for a web-browser, web-site network connection. In this case, however, both connections will be separate. This experience is probably familiar with any individual who has attempted to place a call to an organization while simultaneously browsing the organization's website. Here a phone number is used to access the AA/IVR system, while an IP address is used to access the website. This mode of communication is one example of simultaneous voice and data channel communications. In this case, the voice and data channels are driven by separate user inputs.

There are also newer integrated computerized AA/IVR systems that integrate both a voice and a data channel to create an integrated voice and data system, where the caller can provide inputs that only drive voice, or the caller can provide a combination of inputs for a voice and data channel. These newer integrated and computerized AA/IVR systems are referred to as visual IVR systems or visual auto attendant voice response systems. Currently visual IVR systems have had limited success because their deployment is both expensive and logistically demanding. These systems require the installation of a completely new visual IVR or visual auto attendant voice response system on the callee side, as well as visual IVR capable client software on the caller's smart phone. In these newer systems, the systems that handle and transmit visually accessible menu information are logically connected (i.e. often are controlled by the same computer processor(s) and execute at least some software code in common) with the systems that handle the remainder of the AA/IVR system.

Call termination options: In prior art systems, when calls are terminated by the callee (receiver of a call), the caller system does not automatically receive information as to why the callee terminated the call.

BRIEF SUMMARY OF THE INVENTION

Improved call termination options: Modern telephones, such as cellular phones, besides being equipped with processors and memory, are also equipped by advanced graphical user interfaces to allow utilization of more advanced user interfaces for various applications, including voice call application on the cellular phone. These systems also support data communication, or data-channel communication, capability in addition to the voice communication, or voice-channel communication. The present application focuses on the utility of combining data-channel communication alongside a voice channel for purposes of creating improved call termination options. In prior art voice communication over voice channel, when a callee (receiver of a voice call or also, hereon just referred to as call, terminates a voice call (e.g. with a standard "decline" option), no explanations as to why the callee (receiver of the voice call) is terminating the call, or what was the reason a caller had called are given. Here systems and methods that automatically provide improved call termination options are disclosed.

These improved voice call termination options were initially disclosed in applicant's provisional application No. 61/361,885 entitled "*Method and Apparatus for Augmented Dialing System*" (see pages 35 to 42); as well as applicant's provisional application No. 61/361,889, entitled "*Method and Apparatus for Data Channel Augmented Auto Attendant and Interactive Voice Response Systems*" (see page 17 of 17) of the provisional application). The entire contents of both applications 61/361,885 and 61/361,889 are incorporated herein by reference, and in this present application, these improved call termination options are now discussed in more detail.

The invention's improved call termination system and method uses a telephony system that allows for both a voice channel and a data channel. Here a system which allows a caller or a receiver of the call (callee) to automatically provide more context in the form of text messages at the point of an un-answered call, or at the point when a callee decides to decline an incoming call, is disclosed.

The invention allows data channel communication to be performed in the beginning, middle or at the point of termination of voice communication over voice-channel. This is then utilized by the invention to improve call termination systems and method allows a callee user to provide additional information to the caller as to the callee is declining an incoming call. Some examples of such information can include easy-to-send messages, such as the one-touch text messages explaining why a call may have been initially declined, are shown below:

"Busy, will call back shortly"
"Busy, will call back later today"
"In a meeting right now, can't talk, please call back later"
"Please call back later"

Some other examples of useful messages that, in response to simple touch commands by the user, the system can send at the end of a call include:

"Just called to say hello, nothing important"
"Call back at your convenience"
"Please call back as soon as possible"
"Urgent, please call back now"
"Sorry . . . Dialed by mistake"

Other embodiments of the invention address additional applications of the invention of utilization of data channel alongside of the voice channel at the beginning, during or at the end of voice communication over voice channel were covered in other parent applications in this series, such as applicant's parent application Ser. No. 14,827,742. One application that had been covered has been in the area of enhancement to user interaction with the Auto-attendant/Interactive Voice Response (AA/IVR) systems. The text for the parent application is included here as a reference.

One problem with prior art AA/IVR phone systems is that they generally only interact with the caller in the form of voice messages. The AA/IVR phone system will frequently attempt to give a verbal description of a relatively complex sub-menu—i.e. "press 1 if you want sales, press 2 if you want customer support, press 3 if you want personnel, press 4 if you want finance, press 5 if you want our address, press 6 if you want a dial by name directory, press 7 to speak to an operator", rely upon the caller to remember all this, and then interpret the DTMF tones or voice responses sent back by the caller. Present AA/IVR systems do not have any provision for providing either text or visual information back to the caller.

As a result, this audio based response limitation leads to a very slow and often frustrating interactive experience. Audio communication by nature is a serial process—only one word can be said at a time, and the rate of consumption is limited since keeping the voice legible implies that neither the AA/IVR voice verbal description nor the caller response can be transmitted at a high rate. By contrast, text or visual prompts and responses are much faster, which is one of the reason why web based methods are so popular.

Although some of the newer visual IVR systems can, to some extent, integrate voice and text or visual prompts, as previously discussed these newer systems are complex and difficult to implement because they are not backward compatible with audio AA/IVR systems. Rather they require implementation of an entirely new system, which is financially and logistically demanding. Thus some sort of method that would improve on prior art and presently deployed AA/IVR systems, without requiring a complete AA/IVR system upgrade, would be desirable.

The invention is based, in part, upon the insight that if methods could be devised to bring some of the enhanced speed and convenience of text and graphic based prompts and responses to prior art audio based AA/IVR systems without requiring updates to already deployed AA/IVR systems, these systems would become both much easier and faster to use, and also potentially represent a new forum in which to bring additional information, commercial messages, and promotional messages to AA/IVR users. The net result could be a win-win scenario in users of such enhanced AA/IVR systems would appreciate the increased efficiency and ease of use of the system, while the owners or managers of the enhanced AA/IVR system or service could have an additional venue in which to bring additional product, service, or promotional information to their callers. Such methods of bringing enhanced speed and convenience of text and graphic based prompts and responses to AA/IVR systems, which do not require updates to already deployed AA/IVR systems, can also be enhanced over time to provide server side mechanisms for synchronizing voice and data channels.

This invention is made possible, in part, due to the proliferation of "smart" (computer equipped) telephones, often equipped with an ability to communicate over both a real or logical voice channel and separate real or logical data channel. For example smart cellular telephones, such as the Apple iPhone, Google Droid, and other systems now have both audio input/output devices (microphones, speakers) as well as high resolution bit-mapped color graphical user displays and interfaces, often equipped touch sensitive screens and either real or virtual keypads or keyboards. In addition to smart cellular phones, various wired Voice-over-IP phones also have the ability to establish both voice and data channel interfaces simultaneously. Here, such smart computer (processor) equipped telephones which, in addition to typical phone audio input and output devices, also have graphical user interfaces (e.g. touchscreens) will be referred to as smart phones, and generically as computerized audio communication devices, whether they provide cellular, wireless or wireline connectivity.

The invention's method will frequently be implemented by a combination of smart phones, and smart phone software (applications, apps). In some embodiments, these will work in conjunction with a new type of online (i.e. data network connected, often internet accessible) computer accessible database. This new type of online computer accessible database will often be logically separate (i.e. not be processed by the same instance of a computer program, also referred to as a process) from the (often legacy) AA/IVR system, and often will be physically separate (i.e. running on separate processors on equipment that is often physically separated by distances of feet, miles, or even thousands of miles) from the AA/IVR system. The new method and system will be typically accessed using a data link that is at least logically separate from the telephony link used to establish a communication with the AA/IVR system, and often the data link will be physically separate (i.e. use different frequencies, wires and/or modulation schemes) from the telephony link with the AA/IVR system.

In one embodiment, the invention may be a method of using a computerized audio communication device with a graphical user interface to navigate a remote auto attendant telephony system with a menu structure. This method may consist of obtaining the menu structure information pertaining to the menu structure of the auto attendant telephony system (e.g. the tree of various potential options open to the user, and various responses that the system will accept from the user). Here this menu structure information will be put into an online computer accessible database that is often both logically and physically separate from the AA/IVR system. When the caller uses his or her computerized audio communication device to call and establish a telephony link (i.e. a voice channel or link, or a Voice over IP [VoIP] channel or link, both possibilities of which are often simply referred to in the alternative as the "voice channel") with a given remote auto attendant telephony system (using the telephone number or "directory information" of that remote auto attendant telephony system), one or more software applications running on the caller's communication device will intercept the telephone number or directory information, and either prior to, during, or subsequent to establishing the voice channel also establish a data channel with the online computer accessible database. This data channel will typically be at least logically separate from the voice channel (audio telephony link), and occasionally this data channel may be physically separate (i.e. use different frequencies, wires, or telecommunications protocols) from the audio telephony link as well. The caller's communication device can then retrieve at least some of the menu structure of the auto attendant telephony system over a physically or logically distinct data channel. This application software can then display at least some of the menu structure of the remote auto attendant telephony system on the graphical user interface of the user's computerized audio communication device (smart phone). As it is commonly understood, Data channel is also referred to as data link throughout the application. Similarly voice channel, telephony channel, telephony link, telephony channel are alternatively referred to mean the same element. In the context of current invention it can also be a separate link from the default telephony link.

As a result, in addition to hearing the remote auto attendant's menu structure through the voice channel's audio channel, the caller can also see the same menu structure on the graphical user interface of his or her computerized audio communication device. Since in this case all of the available options at a given point in a menu are presented simultaneously on the caller device's graphical user interface, the caller can make an expedited selection of the option he or she desires. Additionally, either through a real keypad, virtual keypad, or by direct finger presses onto a pressure sensitive display, the user can use the graphical user interface to quickly select the appropriate menu response. The application software can then translate this graphical user interface selection back to the remote auto attendant by either generating a suitable DTMF or other audio signal on the audio channel, or alternatively generating a different type of signal, such as one or more symbols to be transmitted back on the real or logical data channel to the online computer accessible database, and from here back to the remote auto attendant. Working with the menu information downloaded from the online computer accessible database, and generally navigating through a series of various levels on the remote auto attendant's menu or menu-tree, the user (caller) can navigate through the remote auto attendant menu structure. As he or she does so, the application software can continually adjust and update the display of the menu information on the graphical user interface on the caller's smart phone. This allows the user to track exactly where he or she is in navigating the menu structure of the remote auto attendant telephony system menu.

As will be discussed, in addition to this basic set of features, this method and system allows for other information, such as graphics, additional text information, and even promotional messages to also be displayed to a remote caller while the caller is interacting with the remote auto attendant telephony system.

DETAILED DESCRIPTION OF THE INVENTION

For more a detailed discussion of the call termination option embodiment of the invention, please refer to FIGS. 8-9 and the associated discussion, which are provided later in this discussion. First however, other aspects of the invention will be discussed.

As previously discussed, prior art AA/IVR systems, although increasingly flexible and complex in terms of the provider's ability to craft a customized response menu for a call originator, are still primarily limited to only voice based responses. This makes navigating such menus both complicated and slow. Further, because it is difficult for users to remember complex spoken menus, the operator of the AA/IVR system must limit the complexity and number of options provided on the menus.

At the same time, there are a growing number of phones that now have one or more computer processors, memory, and large display screens with graphical user interfaces. These include smart cellular telephones, office Voice over IP (VoIP) phones and other modern phones.

Figure 1:
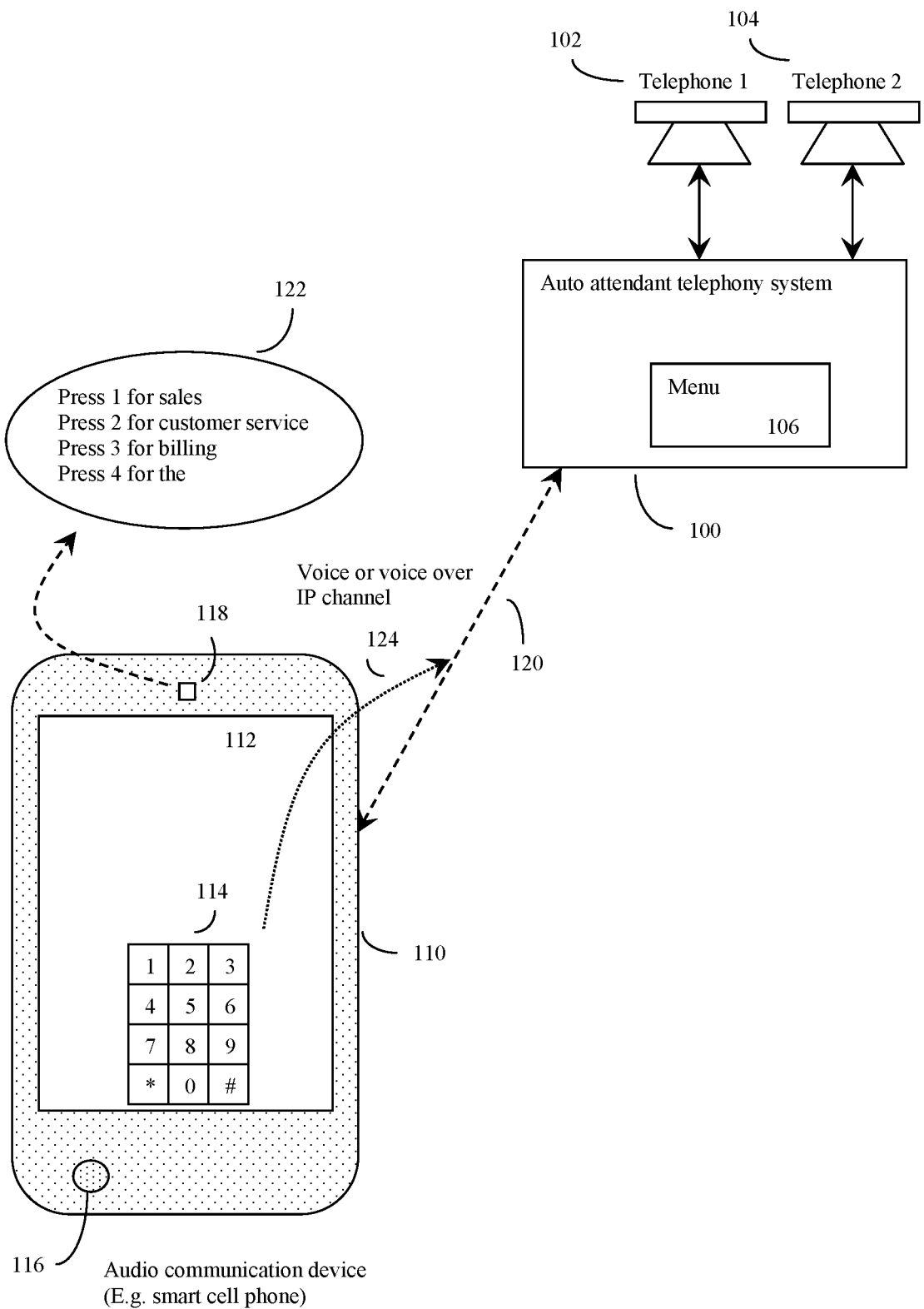
FIG. 1 shows an example of a voice connection to a prior art auto attendant telephony system.

Review of Prior Art:

FIG. 1 shows an example of a voice connection to a prior art auto attendant telephony system. This remote system (100) will often consist of a computer processor, software, sufficient memory storage for storing various menu prompts and voice mail, sound analyzers (i.e. Analog to Digital (A/D) converters or other devices on the incoming audio channels to interpret incoming DTMF signals and/or user voice commands), and generally a plurality of various telephone connections (102), (104) that connect to the various individuals and departments served by that particular auto attendant telephony system. The auto attendant telephony system will have a menu structure (106), typically residing in memory, that is composed of at least the various prompts and caller inputs that the system recognizes, along with various ancillary information such as delay times, audio prompt signatures, and the like.

In use, a caller using a phone such as a smart phone (110), which may be equipped with a graphical user interface (112) (here a bit mapped, touch sensitive graphical display screen) and a real or virtual (i.e. created by a software controlled graphical display of a keypad and a touch sensitive screen) keypad (114) as well as a microphone (116) and speaker (118) can call the auto attendant telephony system using a real or logical audio channel (120) to provide voice inputs and commands. When the caller calls the auto attendant telephony system (100) over voice channel (120), the system will usually answer with a voice message (122) that recites at least the top portion of the system's menu (106), and the caller will hear this message over speaker (118). Once a voice channel (120) is active, selection of any key on keypad (114) results in creation of a DTMF tone (124) to send to auto attendant telephony system (100) over voice channel (120). Auto attendant telephony system (100) on receiving the DTMF input, then navigates to the next level in menu (106). For example, DTMF signals corresponding to selection of key "2" will result in menu (106) to proceed to the next level corresponding to the customer service options.

Figure 2:
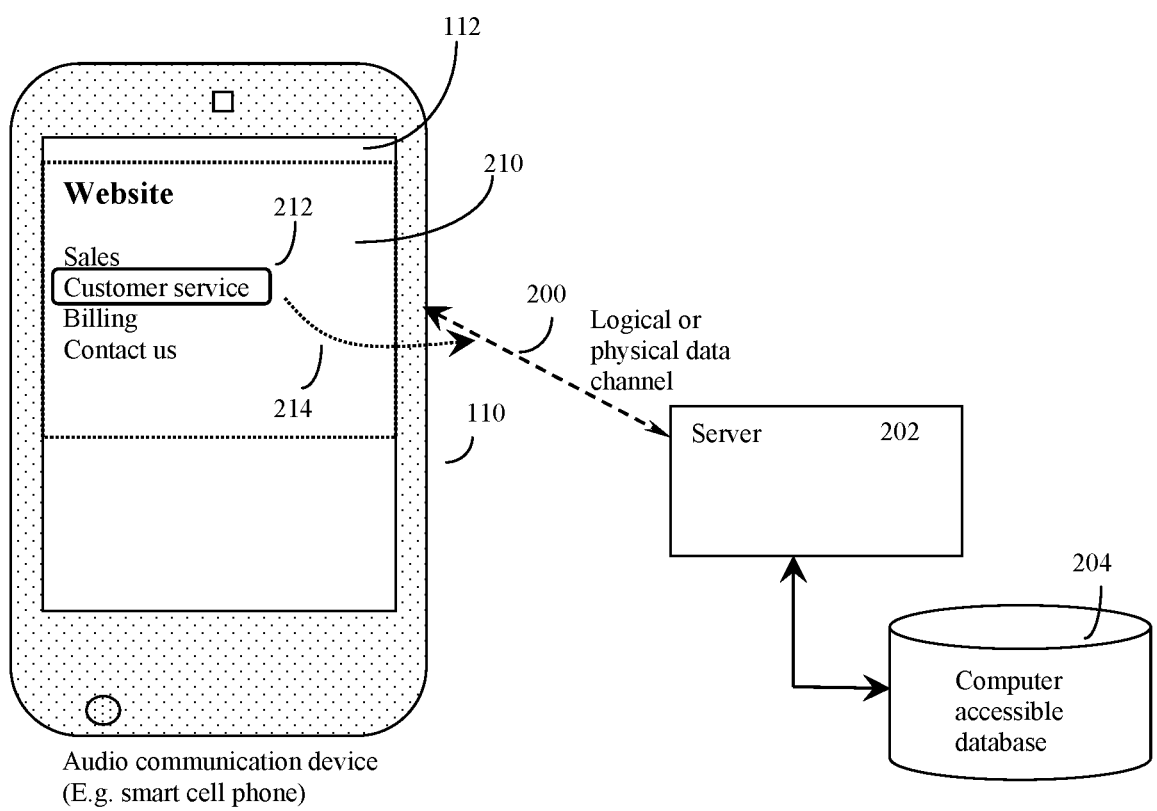
FIG. 2 shows an example of a data connection to a prior art computer server, such as a website or other service supplied by a computer accessible database.

FIG. 2 shows an example of a data connection to a prior art network connected computer server, such as an Internet website or other service supplied by a computer accessible database. Prior art computers and smart phones are also often equipped with network data connections, such as wired or wireless Internet connections (200) that enable the computer or smart phone to establish a physical or logical data channel or link with remote network servers (equipped with computer processors, software and memory), such as web servers (202), which in turn have computer accessible databases (204) that may serve up web pages and other useful information. Using a prior art website as an example, a user of a smart phone (110) equipped with a web browser (210) running in the smart phone's graphical display screen (112) may display information from the same organization that is running the auto attendant telephony system (100) shown in FIG. 1, or a different web server, and interact with that website by, for example touching various web browser links and menu options on a touch sensitive graphical user interface screen (212), or by other methods (e.g. mouse, pointer, keypad, keyboard, etc.), creating the associated request (214) and communicating the request to the web server over the data channel or link (200). The method describing this prior art may employ various known caching techniques such that a number of requests may be satisfied within smart phone.

Figure 3A:
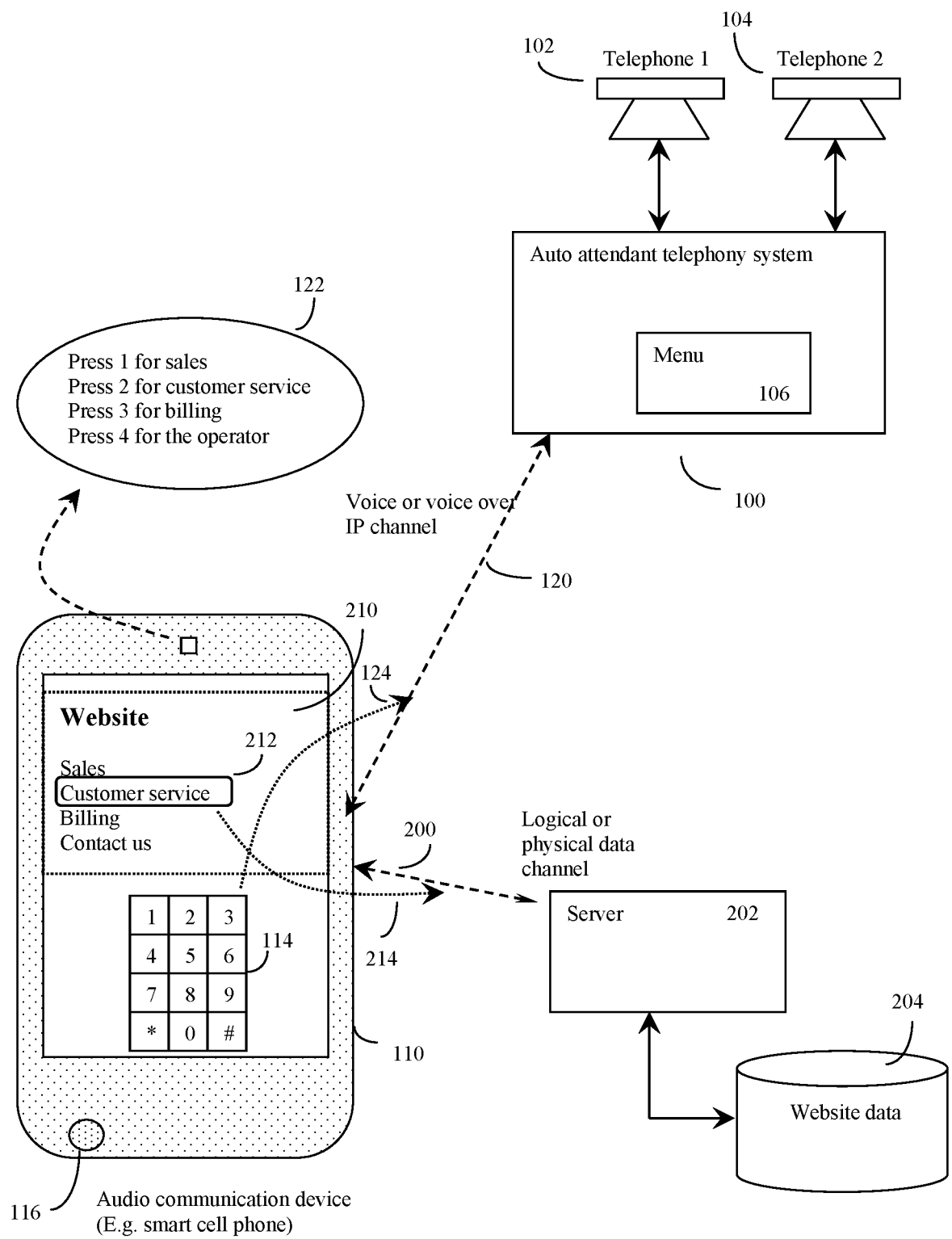
FIG. 3A shows an example of a prior art dual channel smart phone making an audio connection with an auto attendant telephony system while simultaneously making a separate data connection with a separate computer website.

FIG. 3A shows an example of a prior art dual-channel smart cellular phone making an audio connection with an auto attendant telephony system, while simultaneously making a separate data connection with a separate computer website. This prior-art example is essentially equivalent to FIG. 1 and FIG. 2 combined. Although the caller may be in simultaneous communication with an organizations AA/IVR system (100), and with the same organization's web site (200), (204), there is no synergy. That is, the organization's website will not help the caller navigate the AA/IVR system. The two functions act independently.

Figure 3B:
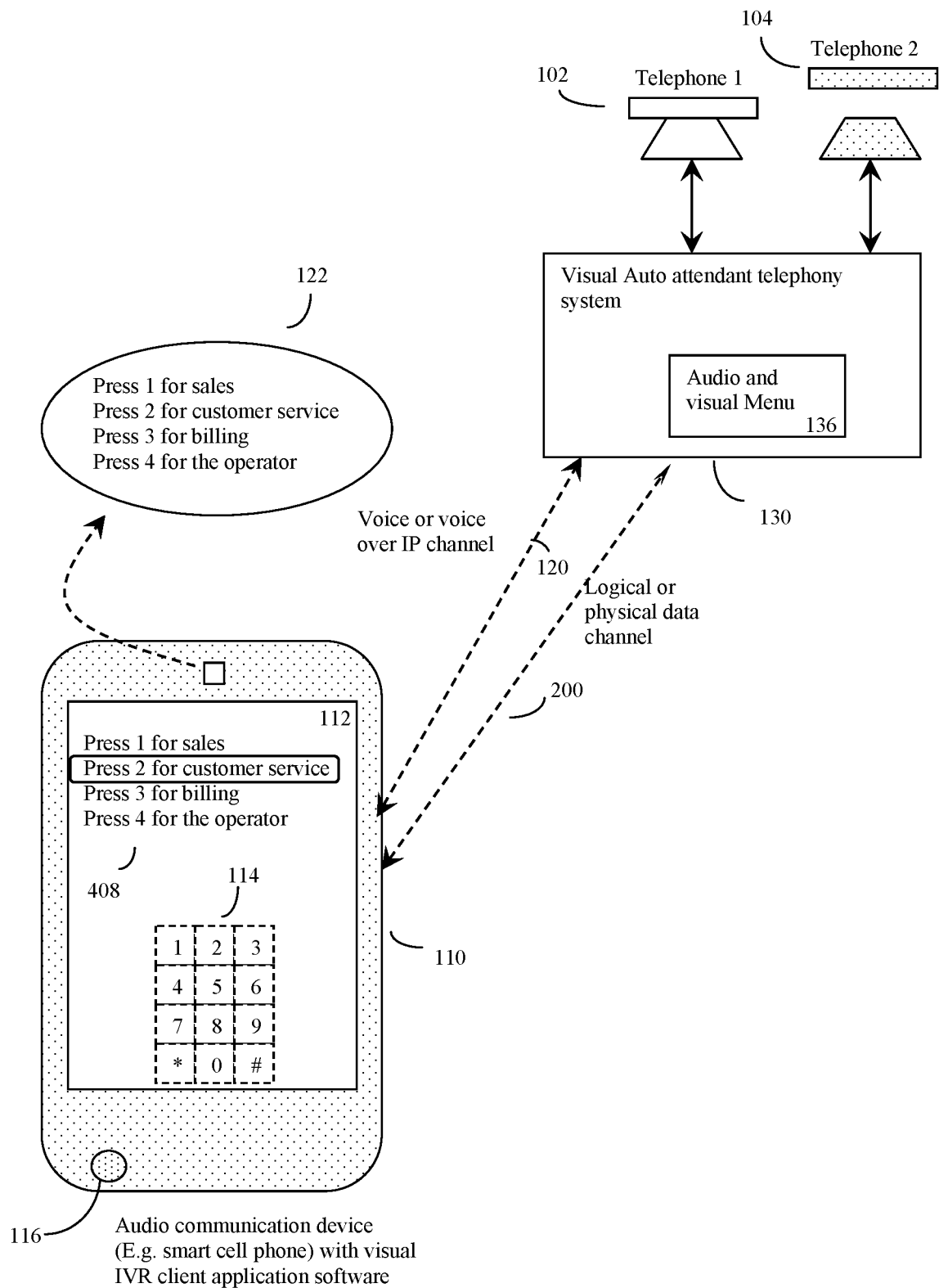
FIG. 3B shows an example of a prior art dual channel smart phone making an audio connection with an auto attendant telephony system, and simultaneously making a separate data connection with a visual auto attendant voice response system.

FIG. 3B shows an example of a prior art dual-channel smart cellular phone making an audio connection with a visual auto attendant telephony system. In this prior art example, simultaneous voice channel (120) and data channel (200) interaction requires, in addition to a new smart phone application (112), replacing auto attendant voice response system (100) with a new class of visually enhanced auto attendant voice response system (130), using an enhanced navigation menu (136). Inputs to visually enhanced auto attendant are generated by selecting keypad (104) and/or visual menu and other information (e.g. extra text, graphic, or even video) information (408). Depending upon the application, selected inputs can be provided to visually enhanced auto attendant over voice and/or data channel.

In the case of at least smart phones exemplified by the Apple iPhone and the Google Droid series of smart phones, it is very easy to add new software applications or "apps" to add additional functionality to the smart phones by downloading these applications from various online application stores or repositories. These applications allow both the functionality and the user interface of the smart phones to be enhanced or altered according to that particular application.

Figure 4A:
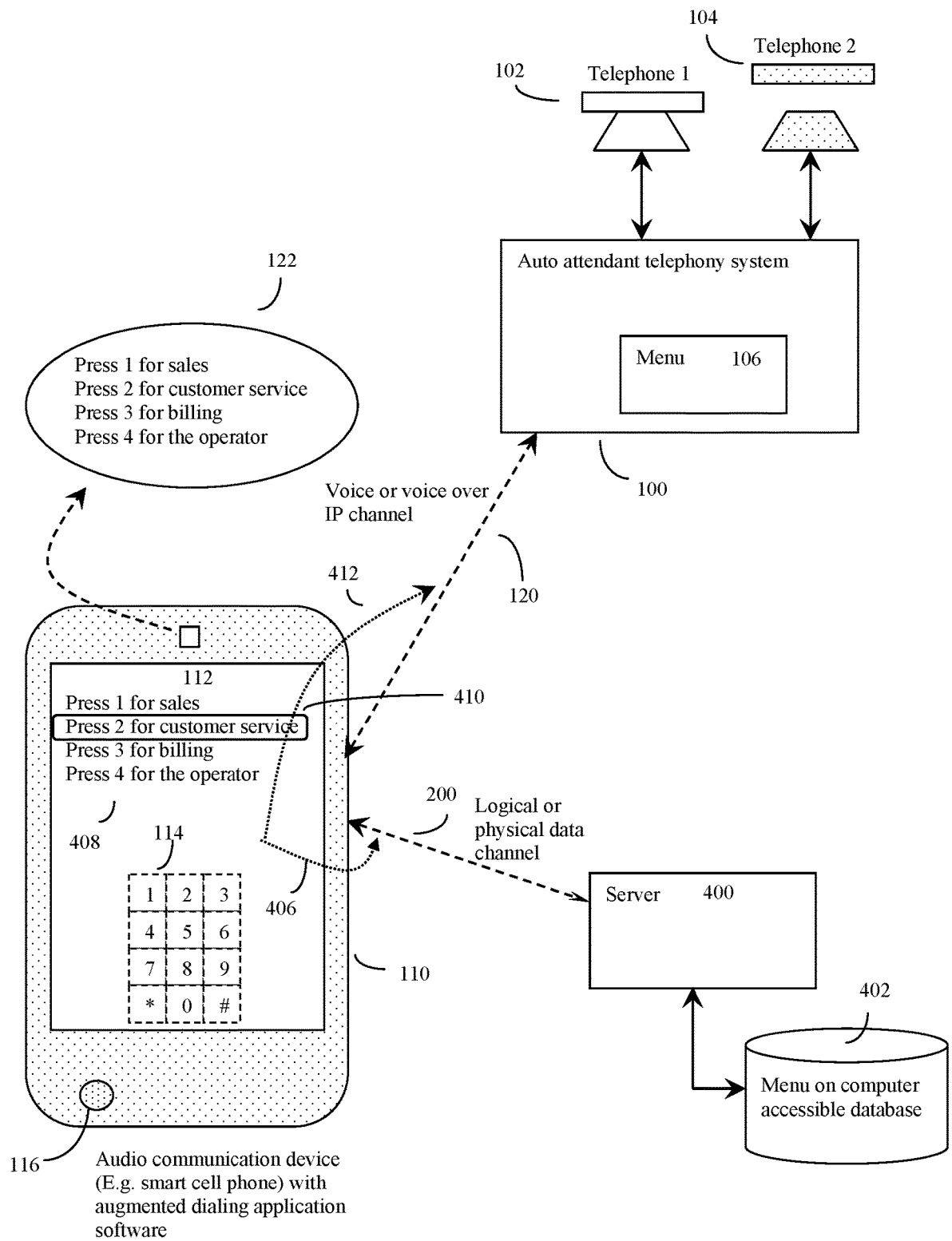
FIG. 4A shows how by using the methods of the invention, the menu structure of an auto attendant telephony system can be relayed to a smart phone by way of a logically separate online computer accessible database and a data channel. This method does not require any new interface or any change to previously deployed AA/IVR systems. Even though the previously deployed AA/IVR system itself has not been changed, the caller is now able to navigate through the auto attendant telephony system's menu structure by way of the caller's smart phone graphical user interface.

FIG. 4A illustrates one embodiment of the invention's data channel augmented auto attended voice response system. In this case (either by one or more software programs preloaded by the manufacturer of the smart phone, or by a downloadable application) the basic functionality of the smart phone can be upgraded. Using this upgraded functionality, when the user (caller) dials the telephone number of another telephone, the smart phone's software can intercept this telephone number (here called directory information), and establish a data channel or link with a logically separate online computerized accessible database. The smart phone can then use the dialed telephone number as an index or search key into this database (402), and if the database knows that the phone number corresponds to an auto attendant telephony system, and also knows the menu for that auto attendant system, then the database can quickly send this menu to the smart phone by the data channel. This process of using the phone number (directory information) as an index to a database that may contain menu information or additional information pertaining to the number that is being called is here termed "augmented dialing".

Using augmented dialing, for example, the graphical user interface for the smart phone may still show a phone number keypad (114), but since the smart phone is also getting menu and other information (e.g. extra text, graphic, or even video) information (408) back from the online database through the data channel (200), then the graphical user interface can also show quite a bit more.

Thus in one embodiment, the invention can be a method of using a computerized audio communication device with a graphical user interface, such as a smart phone, to navigate a remote auto attendant telephony system (i.e. an AA/IVR system) with a menu structure.

This method depends upon first obtaining the menu structure of the remote auto attendant telephony system, and putting this menu structure into an online computer accessible database. The menu structure may be obtained in various ways. It may be directly provided by the operator of the auto attendant system (100). Alternatively, an outside service may manually query the remote auto attendant telephony system, and produce the menu structure that way. As yet another alternative, an automated system may crawl the remote auto attendant telephony system using voice recognition algorithms, using techniques not unlike those of automated web crawling robots. Whatever way the menu structure is put into the database, the database can be designed so that inputting the telephone number (directory information) of that particular automated auto attendant system (100) into the database will act to retrieve the appropriate menu structure (106) information, along with extra information (i.e. extra text, graphics, promotional information) as will be discussed.

When the smart phone (110) establishes a data channel (200) with the online computer accessible database, it will pass the phone number that the user just dialed to the database (402), and assuming that this information is in the database, the database will then retrieve the menu structure information for that particular automated auto attendant (and other associated information as well) and pass it back to the smart phone using data channel (200). The software application running on the smart phone can then take this menu structure information and display relevant portions of it on the smart phone's graphical user interface (408). The smart phone user (caller) can then use this displayed menu structure information to guide navigation through at least some of the remote auto attendant telephony system's menu structure.

Thus, for example, if the menu structure of the AA/IVR system at a particular point presented the user with options such as: "Press 1 for sales, press 2 for customer service, press 3 for billing, press 4 for the operator", then in addition to hearing this portion of the menu from the AA/IVR system in the form of a vocal prompt, the user or caller would also see this on the smart phone's graphical display in writing (408). Depending upon the application implementation, the user or caller may provide inputs in one of several different ways. The caller could simply respond to the AA/IVR system by either pressing keys on a real or virtual keypad (114), directly interact with the menu selection (408) that is displayed on the smart phone's graphical user interface (112), or may elect to speak the menu selections into the smart phone's microphone (116). In each of the approaches for providing input to navigate the menu, for some of the menu traversal steps, the selected input is used to both navigate through AA/IVR system, and to navigate the display menu structure.

For the case when the input is provided by pressing keys on either a real or virtual keypad (114), for some of the menu traversal steps, the selected input may generate both DTMF audio signals (412) back to the AA/IVR system over the voice channel (120), and also a data request (406) back to the server (400) to drive the menu structure information.

For the case when input is provided by interaction with the menu selection (408), for some of the menu traversal steps, the application software may provide a mapping of the selected input to one of the keys of keypad (104), and generate a corresponding DTMF audio signal (412) back to the AA/IVR system over the voice channel (120), as well as a data request (406) back to the server (400) and database (402) to request further menu structure information, and to drive the menu structure information. In another embodiment, instead of mapping the selected input to a corresponding DTMF audio signal, the application software may map the input to a predefined non-DTMF audio waveform (412) that corresponds to the same navigation control and is understood by the speech recognition processing, if any, for AA/IVR system. In this example, the user input might be mapped onto a corresponding English phrase that can be sent to the voice recognition section of the AA/IVR system. This embodiment may be particularly useful for callers with speaking impediments.

In the situation where the caller provides input to the AA/IVR system by speaking the selection into the microphone (116), for some of the menu traversal steps, spoken input, in addition to being sent over voice channel (120), is may be mapped to corresponding data request (406), sent to server (400) and database (402), and also used to drive requests for further menu information, as well as other desired functionality.

In all of the above three input cases, if the data request is not locally satisfied through local memory storage on device (110), the request may be sent to external server (400) and database (402) over data channel (200). Note that for both non audio input mechanisms, i.e. keypad based (114) or display menu selection based (408) mechanisms, the step of creating the corresponding audio signals is shown as step (412) in FIG. 4A and FIG. 4B.

Note that according to the invention this additional ability to navigate by a graphical user interface synchronized with the AA/IVR may be made possible without making any changes to the AA/IVR system whatsoever. This method thus has the substantial advantage of being backward compatible with the hundreds of thousands or millions of previously deployed AA/IVR systems in the field.

Once the user has made a particular menu selection, the remote AA/IVR system (100) will move on to a different part of its menu, and the application software running on the smart phone, knowing the menu selection and the structure of the AA/IVR menu, can update the display of the menu information on the smart phone's graphical user interface to better track the current status of the AA/IVR (remote auto attendant telephony system).

Although during the navigation through the menu structure of AA/IVR, during this discussion it has been often assumed that the smart phone (computerized audio communication device) is capable of operating both a voice channel and a data channel, and that the menu structure information is obtained through the data channel, other modes of operation are also possible. In particular, although the data channel (200) may operate simultaneously with (at the same time as) the voice channel (120), this is not always necessary. For example, right after the user enters in the phone number, but before the voice channel is activated, the smart phone might quickly use the data channel (200) to interrogate the online computer accessible database and find out if the telephone number corresponds to a known AA/IVR system with a known menu structure. If not, then the data channel may not be used further, and the telephone can then put through the call to the other phone number using the voice channel. Alternatively, the online computer accessible database may inform the smart phone that the AA/IVR system menu has various hold periods during which additional information may be retrieved from the online computer accessible database over the data channel. As yet another alternative, the online computer accessible database may inform the smart phone that additional information relevant to the AA/IVR system (such as promotional coupons) is available after termination of the voice channel. This way, the smart phone can manage its use of the data channel, and reduce its power and data use expenditures accordingly.

Not all smart phones are equipped with both long distance voice channels and long distance data channels. Rather, in some embodiments, some smart phones (e.g. smart cell phones) may be equipped with a single long distance voice channel and instead have only a short distance data channel, such as a Bluetooth™ or Wi-Fi data channel available for data use. As long as there is a suitable wireless router nearby capable of picking up the short range data channel and relaying this to and from a more distant online computer accessible database, then the invention can continue to function adequately.

In a somewhat similar vein, some smart phones may communicate voice using voice over IP (VoIP) technology. In a situation like this, the voice over IP channel may be treated as a logical voice channel because usually there is an intermediate apparatus between the voice over IP smart phone and the remote automated attendant (AA/IVR) system that translates the voice over IP signal back into an audio signal. In a situation like this, a smart phone may employ the methods of this invention by communicating with the AA/IVR system using one logical voice over IP voice channel, and also communicate with the online computer accessible database using same IP channel as a logical data channel.

In some embodiments, even though the smart phone is capable of establishing a cellular or PSTN voice channel, in some cases, such as to reduce phone company charges for certain types of telephone numbers, the augmented dialing system may alternatively utilize VoIP technology for the voice channel. This use of VoIP technology for the voice channel may also be useful in other situations as well. For example, some smart phone platforms have built-in manufacturer limitations or constraints that are designed to preclude $3^{rd}$ party application software from directly interfacing with the smart phone's voice channel. Here to overcome this manufacturer constraint, the augmented dialing system may alternatively utilize VoIP technology for the voice channel.

Figure 4B:
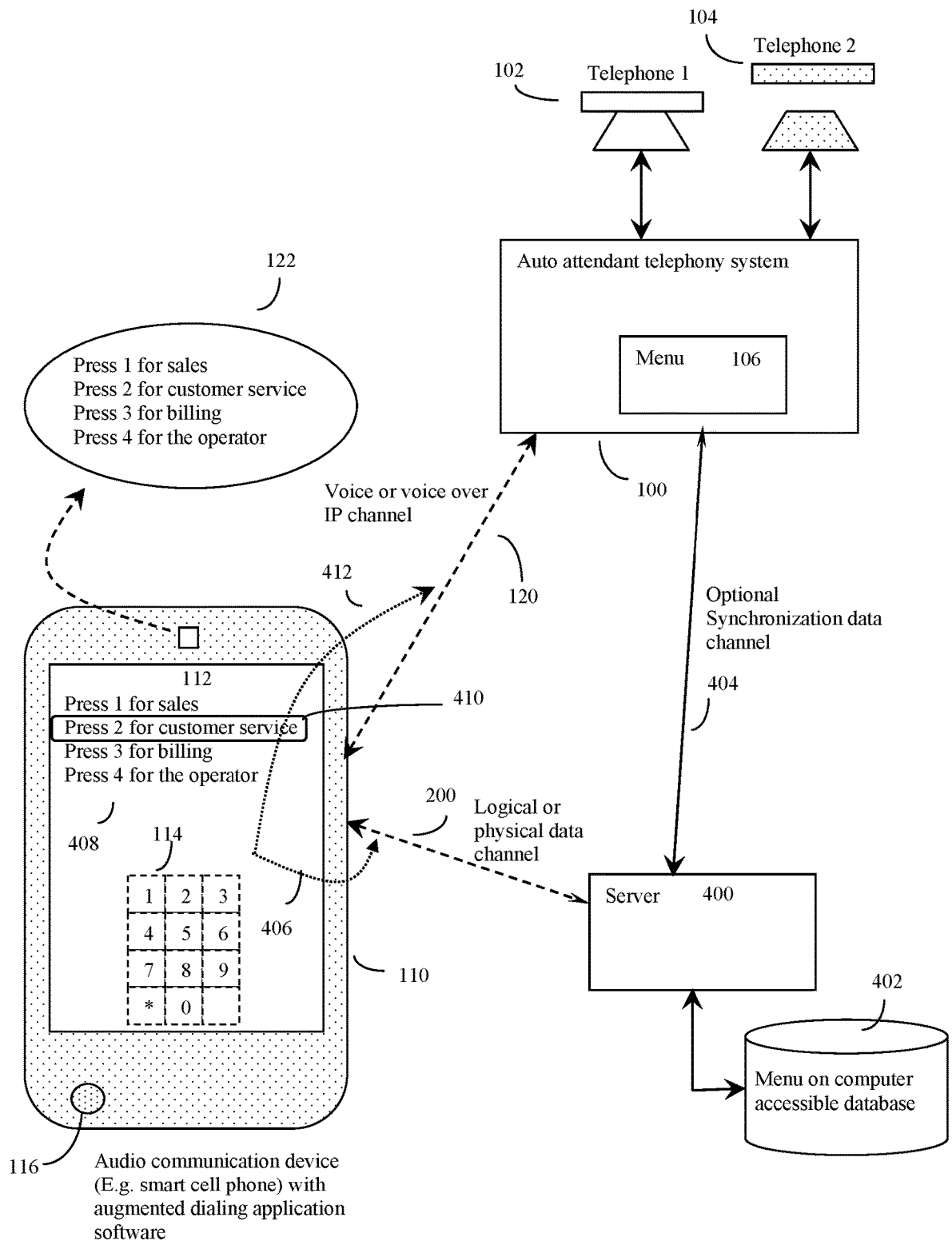
FIG. 4B shows the system described in FIG. 4A, with an optional synchronization data channel between the AA/IVR system, and the computer accessible database.

FIG. 4B adds a synchronization data channel (404) between the server (400) and the auto attendant telephony system (100). The system shown in 4B is generally similar to the system shown in FIG. 4A 400, except that in this case, data channel 404 can be utilized to achieve an added synchronization of voice and data channel. This can be particularly useful in situations where the AA/IVR menu structure requires that the caller provide additional non-menu input (such as caller identification information) that does not relate to the navigation of the AA/IVR menu structure. When such non-menu input data is required, the normal menu progression is interrupted because the auto attendant telephony system (100) will typically need to validate whether the combination of inputs provided by the caller is valid or not, before menu navigation can progress further.

In the system described in FIG. 4A, such identification input, along with the subsequent need to validate the identification input, may cause interference with normal menu navigation. In the case where data channel (404) is present, data channel (404) can be utilized to communicate the outcome of the validation step, and thus automatically synchronize voice channel (120) and data channel (200) to the next step in the menu structure.

In the case where synchronization data channel 404 is disabled, the system defaults back to methods previously described in FIG. 4A. In this case handling of non-menu input data may be done by an additional synchronization step within the augmented dialing application on the smart phone. This synchronization step may be achieved by the caller providing an additional explicit input to indicate that the non-menu input data step has been successfully completed, and that the visual menu can also be now navigated to the next step. Alternately, this synchronization step may be achieved by an augmented dialing application on the smart phone performing audio processing of the audio message sent by AA/IVR system indicating successful completion of the non-menu input step.

In FIG. 4B, if the synchronization data channel (404) is present, the direction of data flow may occur primarily between the menu structure memory (106) of an auto attendant telephony system (100), and the computer accessible database (402). However in some embodiments, the data may also be sent back from the computer accessible database (402) to the menu memory (106). In this back migration scheme, a user may alternatively enter auto attendant menu instructions into their smart phone, and have these instructions be sent to the server (400) and computer accessible database (402) by the data channel (200) rather than by the audio channel (120).

As previously discussed, in addition to transmitting AA/IVR menu structure data, the online computerized database (402) may also be used to store and transmit additional information. One particularly useful type of additional information is promotional information. This promotional information may contain, for example, graphic images of the products or services offered by the sponsor or owner of that particular AA/IVR system, as well as text, sound, or even video promotional material. Another type of promotional material may consist of coupons that may be sent to the smart phone upon selecting certain AA/IVR menu selections, or upon completion of the voice channel. Thus for example, a caller to a particular business might be rewarded with coupons at the end of the call. Other information can include material such as location maps, and other useful information.

This promotional material (500) may be put onto the online computer accessible database (402) in various ways. Here again, the owner of the AA/IVR system may simply collect and send the promotional material to the operator of the database, or alternatively a third party may also collect and provide this material. As yet another alternative, this promotional material may be automatically or semi-automatically acquired by a web crawling software "robot", which might for example simply visit websites associated with the owner or operator of the AA/IVR system, and produce promotional material based on data from this website.

Figure 5:
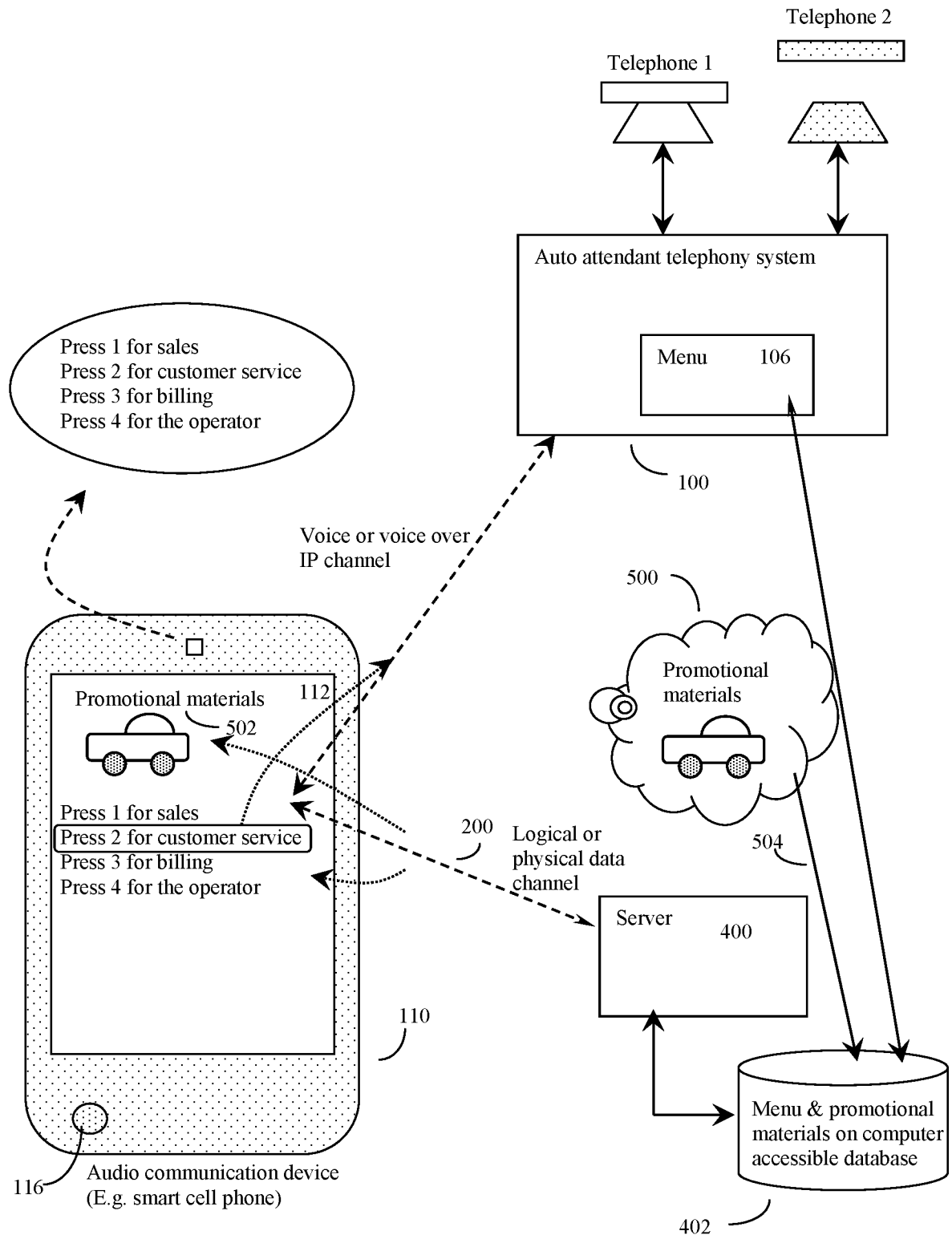
FIG. 5 shows how the invention may also be used to push additional text, graphics, or promotional materials to the smart phone's graphical user interface during a call to an auto attendant telephony system.

FIG. 5 shows how the invention may also be used to push additional text, graphics, or promotional materials to the smart phone's graphical user interface (112) during a call to an auto attendant telephony system (100). This embodiment is generally similar to that of FIG. 4A, with the exception that in addition to storing the menu structure (106) of auto attendant telephony system (100) in computer accessible database (402), database (402) may additionally store other information, such as in this case, graphical promotional information (500). Thus for example, if the auto attendant system (100) is run by an auto dealership, the promotional materials may include graphic images of the dealership's cars. When smart phone (110) downloads menu information from computer accessible database (402) over data channel (200), the promotional materials (500) are also transmitted over the data channel, and the smart phone's application software can display the materials (502) along with the display of the menu structure.

These promotional materials can be input into the database (402) by a network connection (504) or by a wide variety of alternative methods similar to the methods (transfer of memory media, web crawling, third party service) previously used to transmit the menu structure information. Here the term "promotional materials" is intended to encompass any additional information beyond that of the basic menu structure, timing, and audio prompt information utilized by the auto attendant system (100). Thus maps, addresses, news items, video, audio, or any other media may also be sent by this method. Again note that this information need not be displayed in a web browser on smart phone (110)'s graphical display (112), but rather may be displayed by the application software working, as appropriate, with the various smart phone graphical API.

In order to help synchronize the display of the menu of the remote AA/IVR system with the display of its status on the graphical user interface of the caller's smart phone, often it will be useful to include information on the AA/IVR menu timing delays as part of the menu structure that is stored in the online computer accessible database. Thus if, for example, if an AA/IVR system is designed with a menu that becomes responsive to user input only after the AA/IVR system plays a 10 second audio prompt, then this time delay may be included as part of the menu structure information. The user's smart phone can then read this time delay information from the menu structure data that it obtains from the computerized database, and update its display accordingly.

In some embodiments, it will be useful to design the smart phone's application software with an ability to monitor the audio channel for useful incoming audio cues from the AA/IVR system, and also embed information pertaining to these incoming audio cues as part of the AA/IVR menu structure that is uploaded to the smart phone. For example, to improve synchronization between the smart phones display of the status and current menu prompt of the AA/IVR system, and the actual state of the AA/IVR system, the smart phone application software may be designed to monitor the audio input, and detect characteristic sounds, sound lengths, and periods of silence that characterize each level of the AA/IVR menu. This pattern of sounds, sound lengths, and periods of silence can also be included along with the menu structure data and uploaded to the smart phone. Thus if, for example, a particular voice audio prompt from a particular part of the AA/IVR menu such as: " . . . pause 4 "press five to talk to Steve Smith", pause 5, "press six to talk to Jane Yu", the application software can analyze the AA/IVR response for, example, the "s" sounds characteristic of "Steve Smith", as well as the lengths of pause 4 and pause 5, verify that the smart phone is in fact properly synchronized with the remote AA/IVR system, and if not make appropriate corrections. The application software can also monitor for presence of DTMF tones from the AA/IVR system or remote callee, and use this information to achieve proper synchronization with the remote AA/IVR or callee accordingly.

Using these timing and audio interpretation methods, the application software running on the smart phone may additionally monitor the audio connection from the AA/IVR system, and make adjustments to the display of the AA/IVR menu structure on the smart phone's graphical user interface in other ways as well. For example, the application software may monitor the audio sound from the AA/IVR systems for sound patterns typically emitted by that particular AA/IVR system when the incoming caller is put on hold, and display a suitable text or graphic "on hold" message when this occurs. Similarly when the application software detects sounds from the AA/IVR system characteristic of a "hold" ending, this software can again update the smart phone's graphical display accordingly. This way the graphical user interface is always properly synchronized and determined by the current status of the smart phone's voice channel with the AA/IVR system. The application software will also monitor the user smart phone input as well, and use this input as another way to keep the display of the AA/IVR menu synchronized with the actual status of the remote AA/IVR system. This synchronization process can also be termed an "adjust" and/or "track" process.

Figure 6:
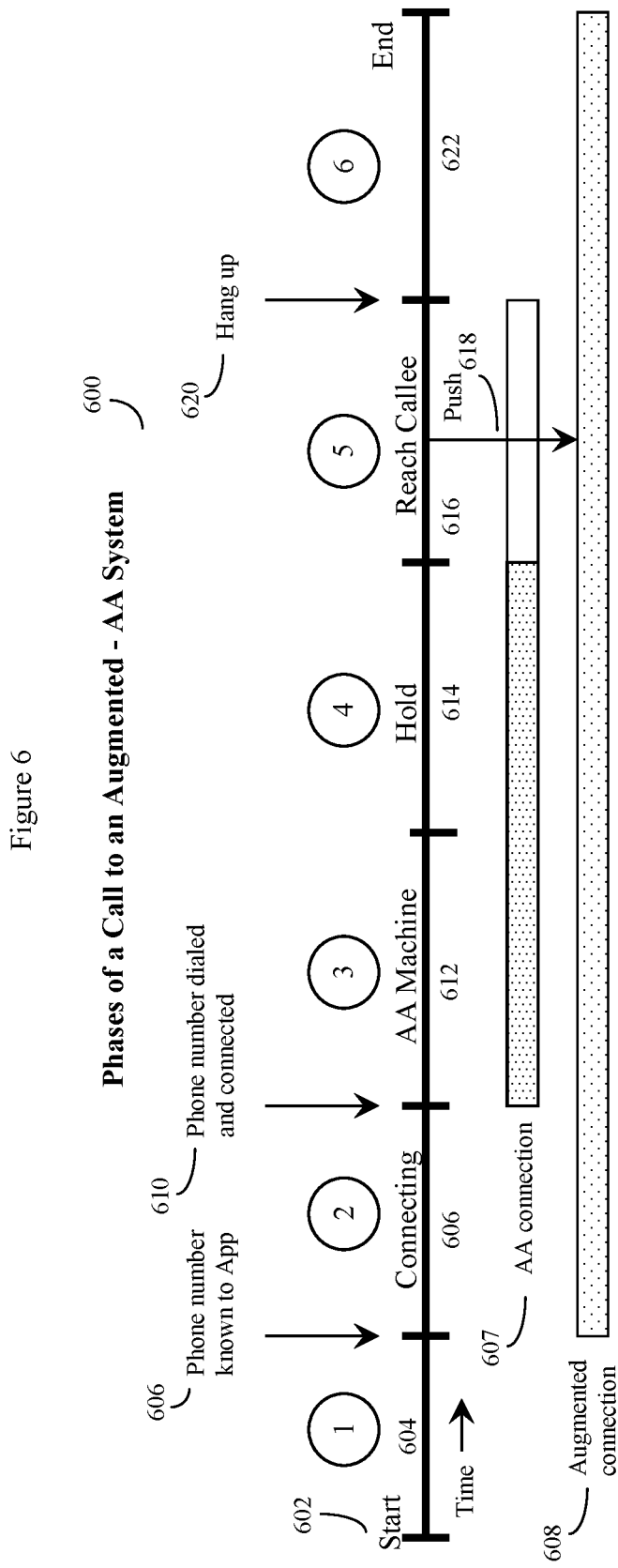
FIG. 6 shows an example of the phases of a call to an auto attendant telephony system using the augmented methods of the invention, showing various phases where such augmented information can be useful.

FIG. 6 shows an example of the phases of a call (or alternatively as the status of the voice channel), to an auto attendant telephony system such as (110) using the augmented methods of the invention, showing various phases where such augmented information can be useful. FIG. 6 shows the timeline (600) for such a hypothetical call.

The call may start (602) when the caller starts entering a telephone number (directory information) onto a real or virtual keypad (114). During this period of time (1) (604), the complete telephone number is not yet known to the smart phone and to the smart phone application software. During this period of time (1) (604), often the smart phone may show a relatively neutral visual display. Once the complete phone number is known to the smart phone augmented or enhanced dialing application software (606), the smart phone may open a data channel (augmented connection) (200) to the computer accessible database (402), and start to retrieve menu structure information (106) and other information either quickly, or alternatively throughout the duration of the phone call and even beyond as is shown in (608). The smart phone will also start connecting to the auto attendant system (100) (606). During this time period (2) (606), either as soon as menu data starts to come in from database (402), or even sooner if the menu data was previously retrieved and stored in a memory cache onboard the smart phone, the smart phone can start to display various pre-messages on its graphical display (112). For example, if the user is connecting to an auto dealership, the smart phone may display an image of the cars sold by the auto dealership (502).

Once the smart phone connects with the auto attendant system (100), (610), the auto attendant system (100) can start sending an audio menu selection (122) to the smart phone by the voice channel or link (120). This occurs during time period (3) (612). During this time, the system may display various menus on the smart phone's graphical display (112).

In this example, assume that the callee is talking on another phone line, and the auto attendant system gives the caller the option to be placed on hold for an undetermined period of time (4) (614). Here the application software running on the caller's smart phone, in addition to monitoring user input from the smart phone to the auto attendant system, may optionally also monitor the incoming audio signal from the auto attendant machine (100) for sounds that are characteristic of the hold process. During the hold period (614), which otherwise would essentially represent wasted time, the invention may take advantage of the opportunity to display promotional material (500), (502) or other information. Here for example, an auto dealership may show images and pricing information on various sales that are currently underway.

Once the caller reaches the callee in step (5), the application software running on the caller's smart phone may again function to detect the change in audio signal associated with the end of the hold process. The caller and callee can then communicate through the normal audio channel during this time. However according to the invention, another method of communication can also be utilized. Here, for example, if the callee wishes to push additional information to the caller, (618), the callee may send the desired information to database (402) by network connection (404), and this in turn may be relayed to the caller's smart phone by way of server (400), and data channel (200).

Once the caller and callee terminate their conversation and hang up (620), there is yet a final post-termination phase of the phone call (6) (622) that can also be utilized according to the invention. Here after the voice channel (120) but possibly not before the data channel (200) is terminated, the data channel may be utilized to transmit additional promotional material, such as coupons and the like, to the caller.

In FIG. 6, the time periods of operation of the auto attendant system is shown as (607) (here the auto attendant may be operating in the background during the last part of the call) and the period of time of operation of the augmented or enhanced dialing connection and data channel is shown as (608).

As previously discussed, nearly all cellular telephone users, and even many land line users, are currently connected to at least simple auto attendant systems by way of their telephone carrier.

Although the case where the remote auto attendant telephony system is an auto attendant telephony system (AA system) or an interactive voice response system (IVR system) has been frequently used in this specification, other types of remote auto attendant telephony systems are also possible. For example, it has now become standard in the cell phone industry, as well as very common for land line phones as well, to route an incoming caller to an automated mailbox, which may be controlled by the cell phone or land line phone carrier. This situation meets the criteria of an auto attendant telephony system as well, because such standard answering systems have both audio prompts and at least simplified menus. Thus the methods of the present invention can be used even when the callee is simply a private individual with a cell phone or land line who is using a standard cell phone carrier or land line carrier answering service. In this specification, whenever an AA/IVR system is used as a specific example of a type of remote auto attendant telephony system, the example should be considered to extend to all types of remote auto attendant telephony systems.

Figure 7:
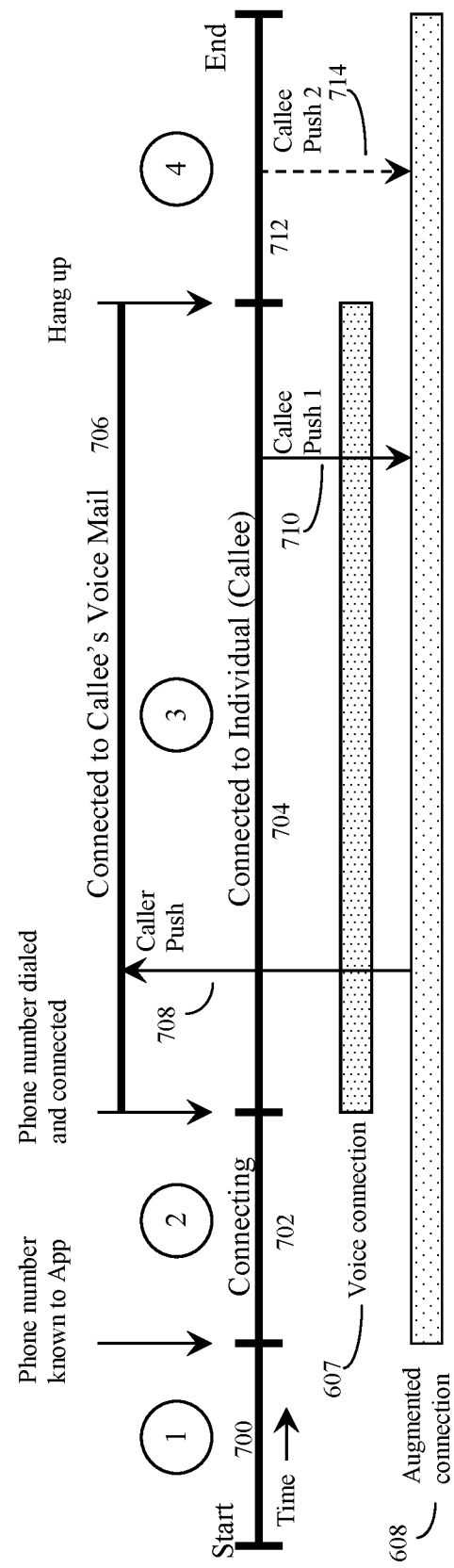
FIG. 7 shows an example of the phases of a call to an individual without using either a simplified auto attendant telephony system or no auto attendant telephony system, showing that the augmented connection can also be used independently to transfer additional data either during or after a telephone call.

FIG. 7 shows how the invention may be highly useful even in the situation where a caller is using a smart phone to call a callee who may only ostensibly have a cell phone and land line, and may not have an obvious auto attendant system.

In FIG. 7, a smart phone caller is calling an individual. Here as before, during the first phase of the connection (1) (700), the phone number of the callee may not be known, and during this time, often the invention will show a neutral or general display on the user's smart phone.

During the second phase of the connection (2) (702), the callee's phone number will now be known to the smart phone's application software, and according to the invention, a data channel (200) may be opened to the computer accessible database (402), allowing menu structure information (106) to be downloaded to the smart phone (110). Alternatively this information may be already residing in the smart phone's memory cache from a previous call. In the case where the callee is an individual, the menu structure information may additionally include information pertaining to the capabilities of the callee's telephone. For example, if the callee's telephone is a smart phone that itself is equipped with suitable software to receive augmented data on data channel (200), then this fact may be made known to the caller as part of the menu structure information.

In the case where the caller is quickly connected to the callee (3) (704), then the conversation may proceed on the audio channel (120) as normal. However in the case when the callee is unavailable, and the service provider puts the call into a voice mail system (706), then according to the invention, the caller may have an additional option not normally available, which is that if the callee has a suitably capable smart phone system, the caller may elect to push (708) information (such as a message, graphics, voice, etc.) to the callee by way of data channel (200), server (400), database (402) and network connection (404).

According to the invention, there are other opportunities for enhanced or augmented data exchange as well. For example, during the call, the callee may also push (710) information to the caller as well by way of network connection (404), server (400), database (402) and data channel (200). Even after the voice conversation has ended (4) (712), the callee, for example, may elect to push additional data to the caller (714).

FIG. 7 shows an example of the phases of a call to an individual without using either a simplified auto attendant telephony system or no auto attendant telephony system, showing that the augmented connection can also be used independently to transfer additional data either during or after a telephone call.

Figure 8:
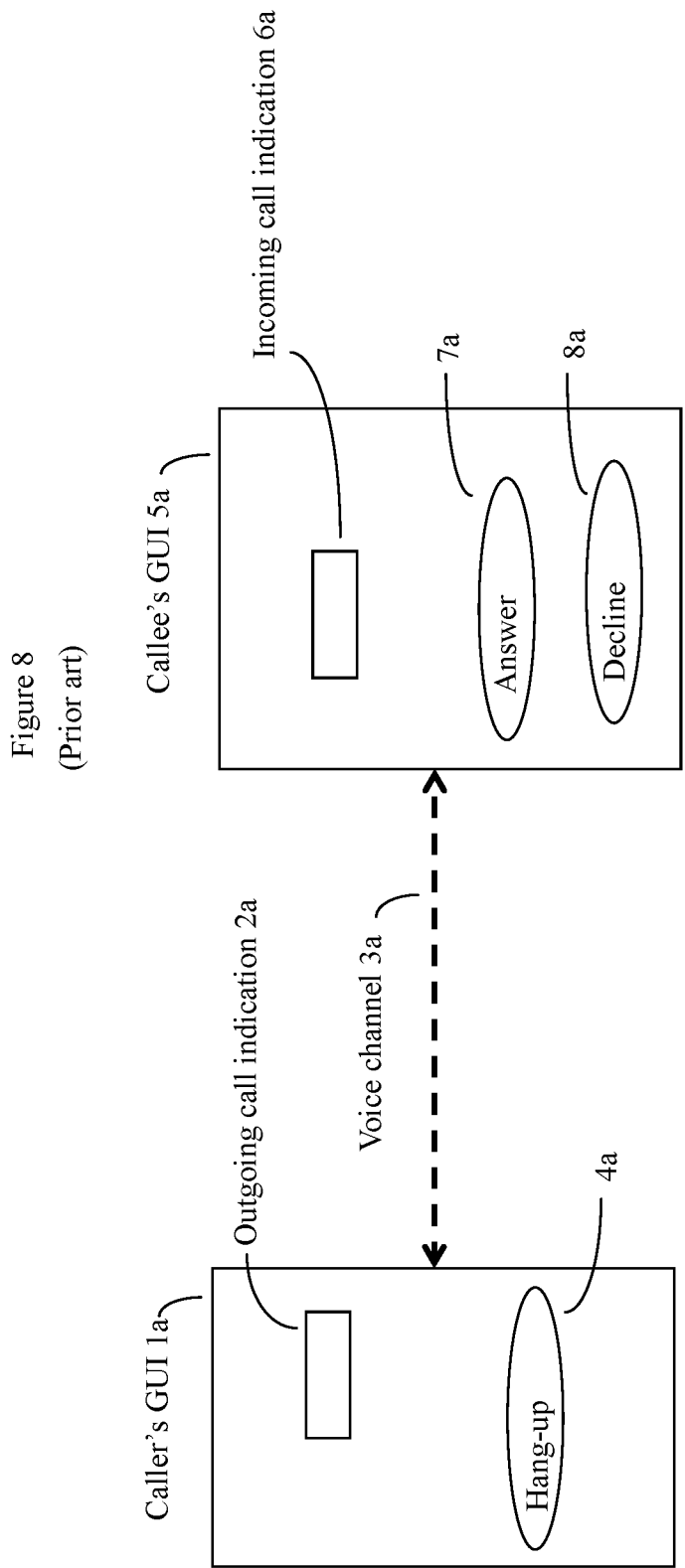
FIG. 8 shows an example of the prior art for call termination (voice channel only systems). Such prior art systems only provided the callee with options to decline or accept calls. Similarly callers were only given options to hang up or leave voice mail.

FIG. 8 shows a prior art example of voice call interactions between a caller and a call receiver (callee). Here (1a) is the dial pad for the caller, (2a) is the outgoing call indication on caller dial pad, (3a) is the voice channel for voice communication, (4a) is the hang-up button for the caller, (5a) is the user interface for the callee, (6a) is the incoming call indication on the callee dial pad, (7a) is the answer button callee user interface, and (8a) is the decline button on the callee user interface.

In FIG. 8, a caller places a call using the caller dial (1a). This results in an outgoing call indication, shown as (2a). The callee sees a receive call indication (6a) on the callee's receive user interface (5a). The voice call is established over voice channel (3a). The callee either accepts the call, such as by using answer button (7a) or declines this call using decline button (8a). The caller may terminate the call using hang-up button (4a). (Here these may be actual buttons, or alternatively may be virtual buttons on a touch screen, and the like).

Figure 9:
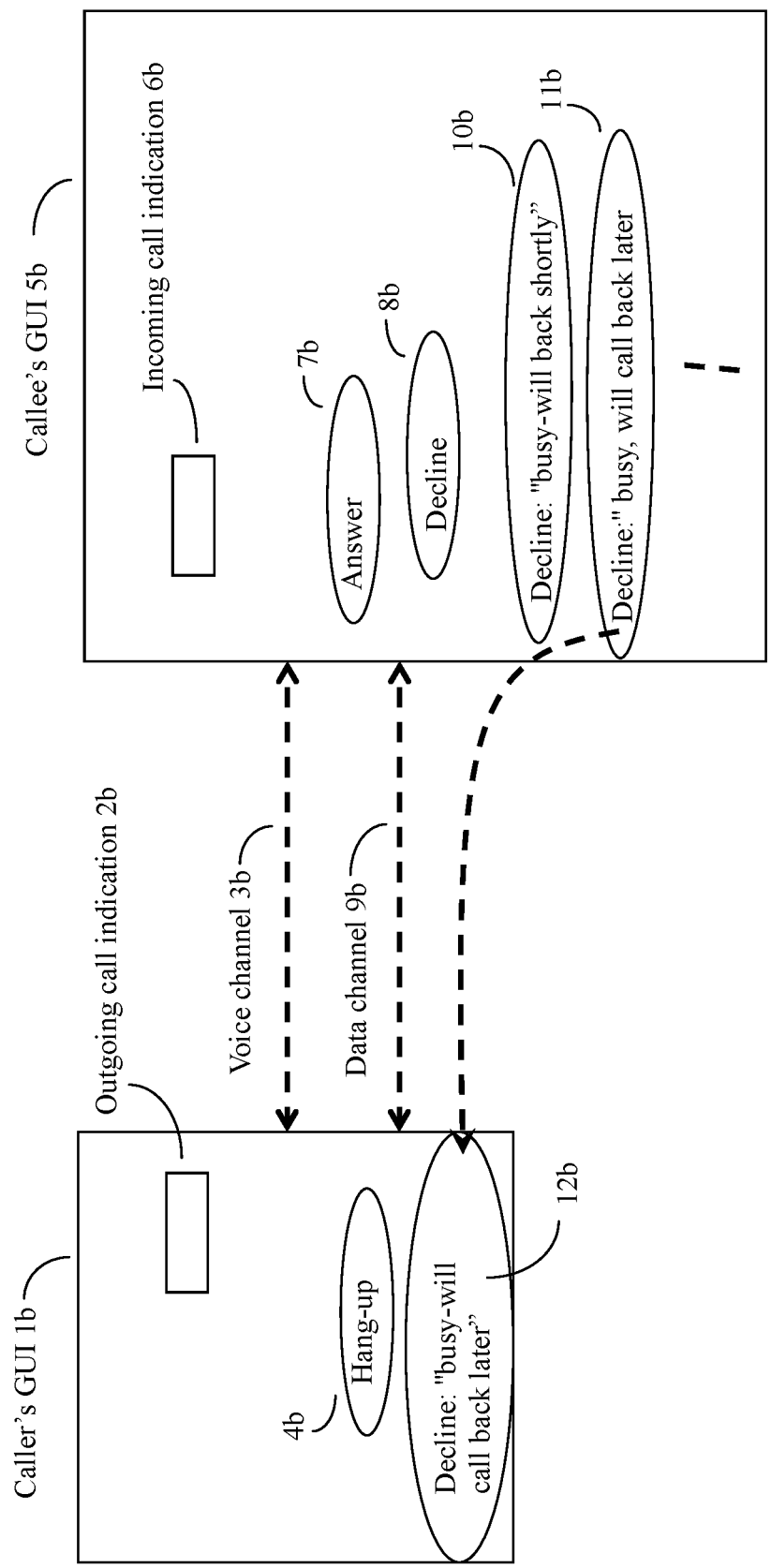
FIG. 9 shows example where a callee (receiver of the call) declines the call, but the invention allows the callee to provide (e.g. transmit) a reason (or context) for this decline (to the caller). Here the invention allows the callee to select from a previously entered list of a list of useful call termination messages that provides this reason (or context).

FIG. 9 shows the example of how, according to the invention, a callee (voice communication receiver) can decline a voice call by selecting one of various pre-selected (pre-populated) text messages. Here (1b) is the dial pad (or touch screen equivalent) for the caller, (2b) is the outgoing call indication on caller dial pad (or touch screen equivalent), (3b) is the voice channel for voice communication, (4b) is the caller hang-up button (or touch screen equivalent), (5b) is the callee user interface, (6b) is the incoming call indication on the callee dial pad, (7b) is the callee answer button on the callee user interface, (8b) is the call decline button on the callee user interface, (9b) is the data channel for sending digital (e.g. text) messages, (10b) is option 1 of a call decline text message, (11b) is option 2 of a call decline text message, and (12b) shows the caller receiving a decline text message (11b) over data channel (9b).

Note that in this disclosure, both the caller communications device and the callee communications device will occasionally be referred to in the alternative as the caller transceiver or callee transceiver. Generally both the caller communications device/transceiver and the callee communications device/transceiver will be capable of both transmitting and receiving audio communication signals through communications links such as wireless, wired, and/or optical links. When certain aspects of the communications device are being stressed, such as receiving or transmitting, the communications device may also be referred to as a caller transmitter/receiver or a callee transmitter/receiver, however again, both the caller communications device and the callee communications device will be capable of both functions, and indeed may (in some embodiments) comprise smartphones with identical hardware, but with differing software mediated functionality (e.g. differing software modules or software routines may be active).

In FIG. 9, a caller places a call using the caller's dial (1b). This results in an outgoing call indication (2b). The callee sees a receive call indication (6b) on its receive user interface/GUI/Dial (5b). The voice call is established over the voice channel (3b). In this example, the callee declines the call, and chooses to do this by sending an appropriate pre-entered/pre-populated text message as reason for the decline, such as (10b) or (11b). This decline text or data message is sent over the data channel (9b). As a result, the call is terminated, and caller also receives the decline text message (12b) giving the reason for this decline.

Thus in some embodiments, the invention may be a method of terminating an audio transmission. This method can comprise obtaining a callee transceiver (e.g. a smart phone) comprising a computerized audio communication device with a processor and a graphical user interface (GUI) type graphical display (such as a touch screen 5b). This callee transceiver will typically be configured to transmit and receive voice communication over a voice channel (e.g. a telephony link 3b). The callee transceiver will often be further configured to use a text messaging system to transmit text messages over at least one of said voice channel (3b) and a separate data channel (9b). According to this method, the callee transceiver uses its processor to form or create (e.g. answer) an audio connection over the voice channel with a remote caller communication device, as well as to display a plurality of call termination text messages (e.g. 10b, 11b) on the graphical display (5b). When the callee user presses one of the GUI selections (e.g. 10b, 11b), the processor will receive this call termination text message selection. The processor will then terminate the audio connection with the remote caller communication device, and transmit a call termination text message associated with the call termination text message selection (e.g. 11b) to the remote caller communication device, where it will then typically be displayed as (12b). This text messaging system can be, for example, a Short Message Service (SMS) system.

In some embodiments, prior to displaying said the various call termination text messages (e.g. 10b, 11b) on the graphical display (5b), the callee's device will also use its processor to determine if the remote caller communication device is a mobile phone, and transmit the termination text message only if the caller communication device is a mobile phone. This can be done by various methods. The processor can, for example, interrogate a database to determine if the remote caller communication device is a mobile phone.

Alternatively or additionally, the callee's computerized audio communication device can further have its own local memory that stores a contact list of various remote caller communication device telephone numbers and remote caller communication device types (e.g. is that caller device a mobile phone or not). In this embodiment, the processor can then interrogate this local memory stored contact list to determine if the remote caller communication device is a mobile phone or not.

As yet another embodiment, the callee device processor can use information from a telecommunication service provider to determine if said remote caller communication device is a mobile phone or not.

In any event, if the callee device processor determines that the remote caller device is not a mobile phone (for example, may be an old style "dumb" land line), then the callee device may not provide this list of call termination text messages (10b, 11b) on the callee GUI (5b) because the caller device may not be sophisticated enough to receive the text messages properly.

Figure 10:
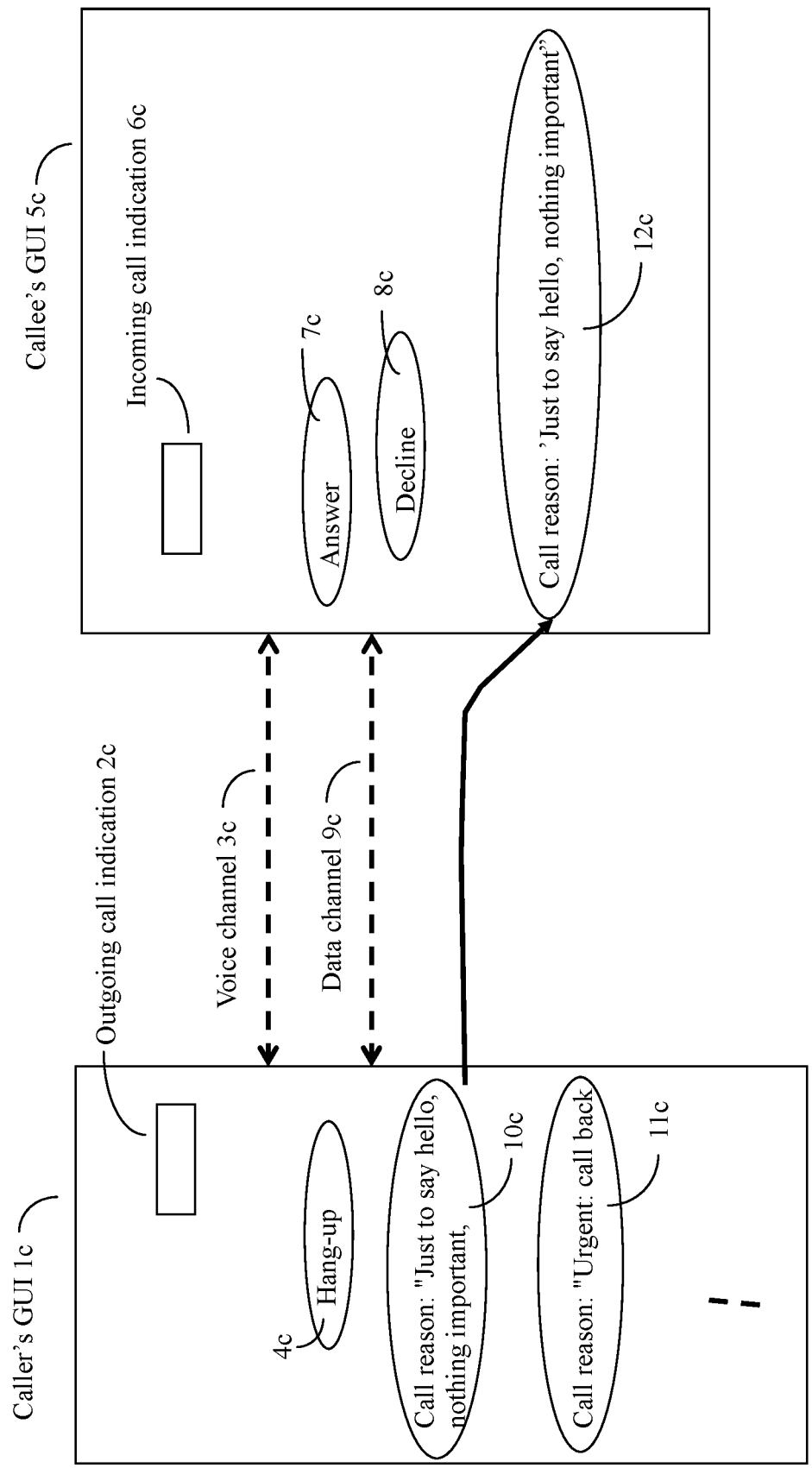
FIG. 10 shows example where a caller, instead of leaving a voice message, instead terminates an unanswered call by the callee by sending a text or other type message. Here the invention enables this option by allowing the caller to select from a previously entered list of useful call termination messages (often text messages), and one of these messages is transmitted to the callee.

FIG. 10 shows an example of how a caller can then terminate a previously initiated voice call while also sending the callee a text or other digital message, from a selection of preselected messages, explaining why the call was terminated. Here (1c) is the caller's dial pad or other user interface, (2c) is the outgoing call indication on caller's dial pad, (3c) is the voice channel for voice communication, (4c) is the caller's hang-up button, (5c) is the callee's user interface, (6c) is the callee's incoming call indication on the callee's dial pad, (7c) is the callee's user interface answer button, (8c) is the callee's user interface decline button, (9c) is the data channel for sending text or other digital messages; (10c) is option 1 of a pre-set text message reason for terminating the call, (11c) is option 2 of a pre-set text message reason for terminating the call, and (12c) shows the callee receiving one of (10c) or (11c) text messages giving the reason why the call was terminated.

In this example, the caller places a call using his device (1c). This results in an outgoing call indication (2c). The callee gets a receive call indication (6c) on the callee's receive user interface (5c). The voice call is established over voice channel (3c). Assumes, for this example, that the callee does not answer, and/or the caller terminates the call early. The caller terminates the call, here by choosing to send an appropriate pre-selected/pre-populated text message (such as one of 10c or 11c) as reason for the call. This text message (or other digital message) is sent using the data channel (9c). As a result, the call is terminated, and the callee receives the text message (12c) giving the reason for the call or the reason for the early termination.

Thus in some embodiments, the invention may be an alternative method of terminating an audio transmission. In these embodiments, the method may comprise, obtaining a caller transceiver comprising a computerized audio communication device with a processor and a graphical user interface type graphical display (1c). This caller transceiver will typically be configured to transmit and receive voice communication over a voice channel (3c) comprising a telephony link. This caller transceiver will typically also be further configured to use a text messaging system to transmit text messages over at least one of the voice channel (3c) and a separate data channel (9c). Here the caller device processor can be used to detect an audio connection over the voice channel (3c) with a remote callee communication device. Here the caller device processor will display a plurality of call termination (10c, 11c) text messages on the caller's graphical display (1c). The caller user will typically select one of these. The caller device processor will receive this call termination text message selection (e.g. one of 10c, 11c) from the GUI, and then terminate the audio connection with the remote callee communication device and transmit a call termination text message associated with this call termination text message selection to the remote callee communication device.

In some embodiments, prior to displaying said the various call termination text messages (e.g. 10b, 11b) on the graphical display (5b), the caller's device will also use its processor to determine if the remote callee communication device is a mobile phone and utilize transmission of text message at the point of call termination by caller if the callee communication device is a mobile phone. This can be done by various methods. The processor can, for example, interrogate a database to determine if the remote callee communication device is a mobile phone.

Alternatively or additionally, the caller's computerized audio communication device can further have its own local memory that stores a contact list of various remote callee communication device telephone numbers and remote callee communication device types (e.g. is that callee device a mobile phone or not). In this embodiment, the caller device processor can then interrogate this local memory stored contact list to determine if the remote callee communication device is a mobile phone or not.

As yet another embodiment, the caller device processor can use information from a telecommunication service provider to determine if said remote callee communication device is a mobile phone or not.

In any event, if the caller device processor determines that the callee device is not a mobile phone (for example, may be an old style "dumb" land line), then the caller device may not provide this list of call termination text messages (10b, 11b) on the callee GUI (5b) because the callee device may not be sophisticated enough to receive the text messages properly.

Voicemail options: In some embodiments, the invention may also be utilized in conjunction with a voicemail system. In these embodiments, the caller device may employ various methods to determine if the call is going to the callee's voicemail, and if so provide various options to the caller.

In one embodiment, the caller device processor may display various call termination text messages options on the caller's graphical display (1c) when the processor determines that the caller's voice call is being forwarded to the callee's voicemail. Here the processor can make this determination by, for example, receiving an explicit "going to voicemail" notification from the remote callee audio communication device. Alternatively, the processor can make this determination by analyzing the voice mail audio signals received from the remote callee audio communications device. For example, if the caller processor hears a "record you message" audio signal, it can determine that the call is going to voicemail, and take appropriate action. There may be other methods for analyzing the communication on the voice channel to determine if the voice call has been transferred to voicemail. As further example, Caller communication device may perform signal analysis to know if the call has been forwarded to voicemail.

Alternate Embodiments

In addition to some of the alternate embodiments already described in the main text, several other embodiments are also possible. For example, in an alternative embodiment of the invention shown in FIG. 4A, voice channel (120), instead of connecting to the Auto attendant telephony system (100) directly, may alternatively connect through other types of bridging solution such as hosted VoIP systems. In another alternate embodiment, the smart phone may be a wireline smart phone with embedded processing capability, a graphical user interface, and an ability to establish one or more data channels.

Note further that the user interface display graphics shown in FIGS. 1, 2, 3, 3A, 4, 4A, 4B, FIG. 5 are for illustration purposes only. Many other different types of related user interfaces and user interface designs are also possible within the scope of the invention.

In another alternate embodiment, the smart phone may exist in the form of telephony application (software) for any internet connected computerized device, such as a desktop computer, notebook computer, netbook, or tablet computer.

In some embodiments the smart phone may implement the invention as an application running on an embedded processor within an internet connected wireline telephone with a visual display and a virtual or physical keyboard and capability.

In some embodiments the smart phone may implement the invention as firmware running on an embedded computer processor. In other alternatives it may be implemented as hardwired state machine in an embedded computer controller.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

Call Termination Methods

In some embodiments, the call termination methods previously taught by applicant in his provisional patent application 61/361,885, filed Jul. 6, 2010, and incorporated herein by reference, may also be used.

As previously discussed in 61/361,885 various text messages and SMS message schemes may be used to terminate calls. These various options are described below:

I: Call Termination with One Touch Text Message (TM) Message by Callee

In this embodiment, on receiving a call on a phone with "augmented dial" capability, besides standard "Answer" or "decline" options, for a sub-set of caller phone numbers callee sees additional options, for example option to send one of the pre-determined text messages by a one touch selection.

Some examples of useful one-touch messages are
"Busy—will can back shortly
"Busy—will call back later today"
"In a meeting right now, can't talk right now, pls. call back later'
"Please call back"

II: Call Termination with One Touch Text Message by the Callee, when the Caller's Phone Device is Identified as Being a Mobile Phone In this embodiment, the option to send SMS/Text message at the point of call receive at the callee should only be presented once the callee device knows that the caller's phone number is associated with a mobile phone number.

Here, various mechanisms for knowing that the caller's phone is a mobile number may be used Mechanism 1—The Callee's Receiver Agent (Processor) Interrogates the Local Contact List Based on the CallerID Contact lists on a phone typically allow holding more than one contact phone numbers for a person, and usually allow categorizing whether a phone number is a mobile number or not, The callee receiver module interrogates contact list with the callerID (caller's phone number) provided at the point of the call to determine if the call is being made from a mobile number. In case the call is being made from a mobile number) the callee is presented with the additional call termination options, including options for terminating call with sending one of the pre-determined text message to the caller using the caller's phone number as the targeted recipient phone number for the text message.

Mechanism 2—The Callee's Receiver Agent (Processor) Interrogates a Database Identifying Whether a Phone Number is a Mobile Number or Not The database may be local or hosted If the database is hosted) receiver agent may initiate the query, or in case the database is hosted with the telephone service provider, the service provider itself may send the information over to the receiver agent. Any of the communication protocols may be used to satisfy this query.

In case the query determines that the caller's number is a number of a mobile device, additional one-text message options are presented.

Mechanism 3—In Addition to the CallerID (Caller's Number), the Telephone Service Provider Also Indicates to the Callee Receiver Agent that the Caller's Phone Number Corresponds to a Mobile Device.

If the telephone service provider at the point of establishing the call also provides the information whether the caller's phone number is a mobile number, callee's agent can decide to offer additional termination message options to the callee.

IV: Call Termination with One Touch Text Message by Caller

In this embodiment, on dialing a call on a phone with "augmented dial" capability, for unanswered calls, besides standard leave voice mail, or disconnect options, the dialing agent at the caller presents an option of disconnecting call with sending one of the predetermined text messages by a one touch selection Some of the examples of useful one-touch text messages that provide reason for the call to send at the end of the call are "Just called to say hello, nothing important"
"call back at your convince"
"Pls. call back as soon as possible"
'Urgent, pls. call back now"
"Sorry . . . Dialed by mistake"

Note that in some systems, "reason for the call" may optionally only be displayed if the caller's dialer detects that the call has gone to the voice mail. Some of the methods for detect that the call has been transferred to voice mail are as follows 1) There may be explicit notification by the callee phone when call gets forwarded to the voice mail, or
2) The caller dial agent may detect local techniques of voice recognition to know when such a transfer happens by analyzing the voice channel real time. Transfer to recorded message and recorded message tone itself is commonly distinct to be able to classify whether the voice on the voice channel is from a live person or from a recorded message on the voice recording machine. In this case it is understood that there may be small number of cases when caller dialer may incorrectly classify the source of the voice and may or may not display the "reason of the call" erroneously.

Call Termination with One Touch Text Message by the Caller, when the Callee's Phone Device is Identified as Being a Mobile Phone In this embodiment, the option to send an SMS message at the point of call to disconnect should only be presented once the caller device knows that the callee's phone number is associated with a mobile phone number.

Mechanisms for Knowing that the Caller's Phone is a Mobile Number

Mechanism 1—For the numbers dialed from the local contact directory Caller's dialing agent may know based on the categorization of the phone number by the caller himself/herself. If the callee's phone number is categorized as a mobile phone number, the dialer may present additional options for termination of the call.

Mechanism 2—The caller's dialer agent interrogates a database identifying whether a callee's phone number is a mobile number or not. This database may be local or hosted. If the database is hosted, the dialing agent may initiate the query, or if the database is hosted with the telephone service provider, the service provider itself may send the information over to the dialing agent. Generally, any type of communication protocol may be used to satisfy this query. If the query determines that the callee's number is a number of a mobile device, additional one-text message options are presented for call termination.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A method of caller terminating an audio transmission when a callee does not answer, said method comprising:
   obtaining a caller transceiver comprising a computerized audio communication device with a processor and a graphical user interface type graphical display;
   said caller transceiver configured to initiate a call and to transmit and receive voice communication over a voice channel comprising a telephony link;
   said caller transceiver further configured to use a text messaging system to transmit text messages over at least one of said voice channel and a separate data channel;
   using said processor to detect an audio connection over said voice channel with a remote callee communication device;
   displaying, using said processor, a plurality of pre-populated text messages on said graphical display;
   receiving, using said processor, a caller selection of a text message from said plurality of pre-populated text messages, and using said caller selection to terminate, prior to said callee answering, said audio connection with said remote callee communication device and using said caller transceiver to transmit a caller selected pre-populated text message to said remote callee communication device.

2. The method of claim 1, wherein said text messaging system is an SMS system.

3. The method of claim 1, wherein prior to presenting said plurality text messages on said graphical display, using said processor to determine if said remote callee communication device is a mobile phone.

4. The method of claim 3, wherein said processor interrogates a database to determine if said remote callee communication device is a mobile phone.

5. The method of claim 3, wherein said computerized audio communication device further comprises local memory configured with a contact list of various remote callee communication device telephone numbers and remote callee communication device types; and
   wherein said processor interrogates said contact list to determine if said remote callee communication device is a mobile phone.

6. The method of claim 3, wherein said processor uses information from a telecommunication service provider to determine if said remote callee communication device is a mobile phone.

7. The method of claim 1, wherein said processor displays said plurality of text messages on said graphical display when said processor determines that an audio message from said caller transceiver has been forwarded to voicemail for said remote callee communications device.

8. The method of claim 7, where said processor determines that said call from said caller transceiver has been forwarded to voicemail by receiving an explicit notification from said remote callee communications device.

9. The method of claim 7, where said processor determines that said call from said caller communications device has been forwarded to voicemail for remote callee communications device performing an analysis of voice signals received from said remote callee communications device.

10. The method of claim 1, wherein said pre-populated text message to said remote callee communication device comprises a message giving a reason for the call.

* * * * *